H. WYMAN & A. A. GORDON.
Assignors to the CROMPTON LOOM WORKS.
FRICTION LET-OFF FOR LOOMS.
No. 11,288. Reissued Nov. 29, 1892.
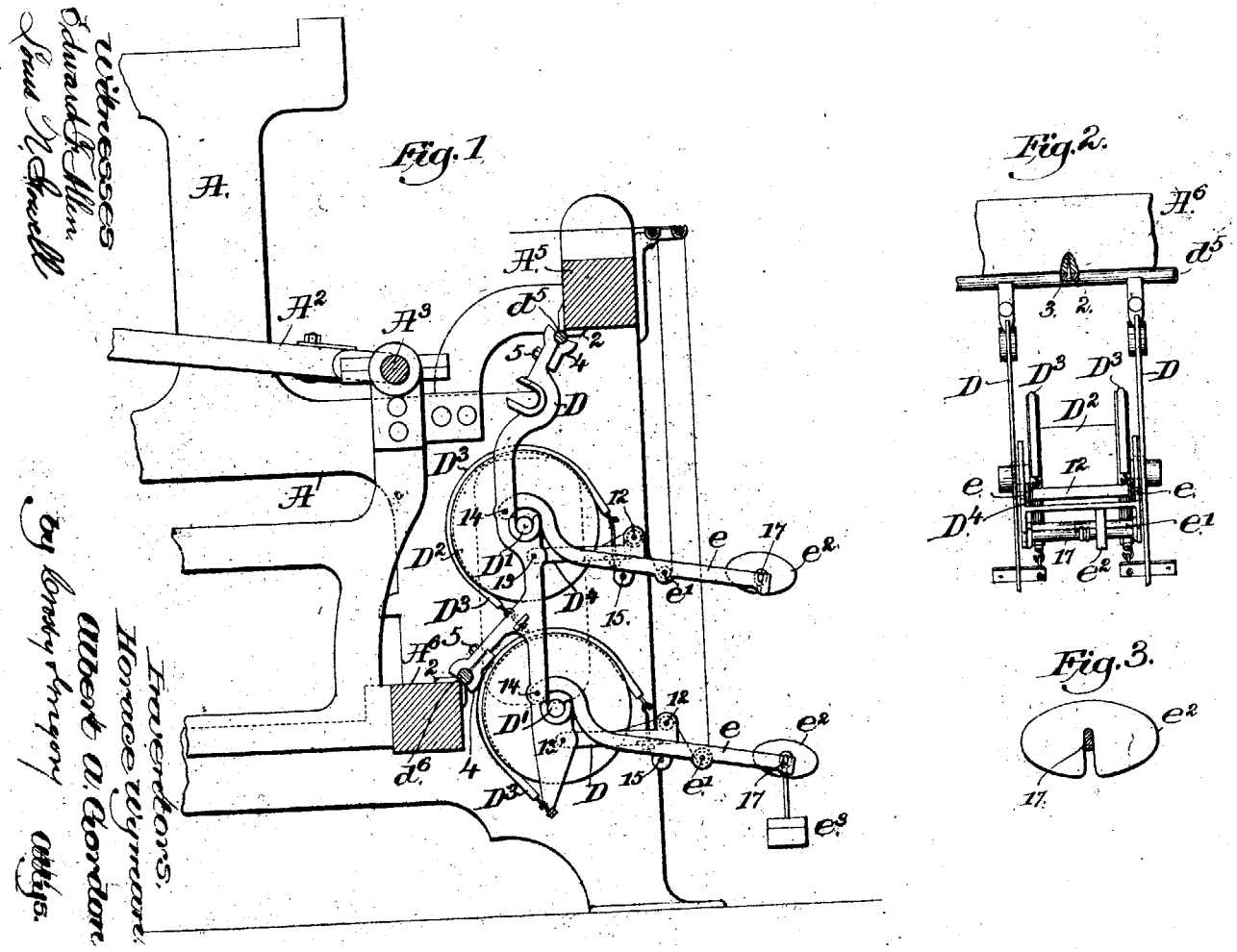

UNITED STATES PATENT OFFICE.

HORACE WYMAN AND ALBERT A. GORDON, OF WORCESTER, MASSACHUSETTS, ASSIGNORS TO THE CROMPTON LOOM WORKS, OF SAME PLACE.

FRICTION LET-OFF FOR LOOMS.

SPECIFICATION forming part of Reissued Letters Patent No. 11,288, dated November 29, 1892.

Original No. 459,355, dated September 8, 1891. Application for reissue filed February 1, 1892. Serial No. 419,990.

*To all whom it may concern:*

Be it known that we, HORACE WYMAN and ALBERT A. GORDON, of Worcester, county of Worcester, State of Massachusetts, have invented an Improvement in Friction Let-Offs for Looms, of which the following description, in connection with the accompanying drawings, is a specification, like letters and figures on the drawings representing like parts.

This invention is an improvement in narrow-ware looms whereby the stands upon which the spools are mounted are provided at each end with a clamping device attached to ways supported by girts, so that the said stands may be adjusted sidewise to adapt them to receive spools of different widths, according to the width of the web to be woven, and although we prefer the shape of way shown yet any other way and clamp which will permit an unobstructed adjustment sidewise will be within the scope of our invention.

Another part of the invention consists of forming the usual let-off levers for the warp-beams of such looms so that the beam may be removed from the stands without severing or cutting the warps, as has hitherto been necessary with the usual form of let-off levers; and it consists in forming the let-off lever, which is usually made in the form of a yoke, so that it will be above the shaft upon which the beam is supported, thereby permitting the beam and its warp-threads to be removed by lifting the yoke sufficiently high to uncover the shaft of the beam. Said yoke may be used with any of the usual arrangements of rolls or bars connected with the friction-band, which passes around the beam-head; the warp passing from the under side of the beam over the bar or roller of a friction-lever and thence under a bar or roller carried by the let-off lever, and thence upward to the back rail, the let-off lever being weighted to produce sufficient strain on the bar and friction-band to hold the beam properly for the process of weaving. Instead of a roller being carried in the yoke-like friction-lever, it may be a bar attached directly to the friction-bands, as it has sometimes been arranged, and operate successfully without the improved yoke passing above the beam-shaft. These stands are very desirable and are quite essential for use in connection with narrow-ware looms where a pair of webs are being woven at the same time.

Figure 1 in vertical section shows a sufficient portion of the rear end of a loom embodying our invention to enable the same to be understood. Fig. 2 is a detail looking from the right in Fig. 1, and Fig. 3 is a detail showing the weight applied to the outer end of the let-off lever *e*.

The let-off device consists, essentially, of two yokes, one of which is provided with a roll under which the warp is passed, while the other yoke carries a roll over which the warp is passed, the latter yoke being connected with a friction-band, strap, or cord extended over the head of the spool. The let-off lever is raised during the process of weaving by the woven web being drawn forward by any usual form of let-off roll or by the action of the reed upon the filling when beating it in at the fell, the said let-off lever having a projection which, when the weighted yoke is lifted to a certain position, acts upon the yoke or lever which is connected with the friction-band $D^3$ and lifts the latter yoke sufficiently to release the friction-band and let the spool turn to deliver warp, the weight upon the weighted yoke acting immediately thereafter to pull the warp from the spool. The let-off lever referred to is pivoted above the bearing for the spool and the friction-lever, as here shown, for the purpose of illustrating the invention, below the said bearing, so that by lifting the let-off lever the shaft for the spool will be readily uncovered to permit the spool with its warp end in the eyes of the usual harness to be removed from the stands without severing or cutting the warps.

Referring to the drawings, A represents the loom-frame; $A^3$, the crank-shaft; $A^2$, the usual connecting-rods to join it with the lay, and $A^5$ $A^6$, cross-girts at the rear of the lay and connecting the side frames of the loom, but one side frame being shown in the drawings, because the other is just like it. The cross-girts referred to are provided, respectively, with guide-rods $d^5$ $d^6$, preferably of cast metal, and have suitable ears, as 2, which may be bolted or secured to the said cross-girts by screws 3, one of which is shown in Fig. 2. The stands D have suitable open bearings for the reception of journals D′ of the warp-spools $D^2$. The stands D are so shaped at their upper and lower ends that in connection with ears 4, bolted thereto by bolts 5, the ends so formed are adapted to embrace the rods $d^5$ $d^6$, which latter may be of any suitable shape in cross-section and constructed as described. These stands may be moved laterally on the said rods to place the stands at any desired distance apart, according to the size of the warp-spool, and also to adapt the stands for the reception of any number of warp-spools, according to the number of warp-spaces and shuttles used in the narrow-ware loom containing the said stands. Each spool has one or both of its heads of such shape as to be embraced in usual manner by a friction-band, as $D^3$, said band having one end thereof fixed, preferably, to some part of the said stand or to a screw thereon, and the other end to a yoke-like friction-lever $D^4$, pivoted at its inner end to the two adjustable stands, the outer end of the said yoke-like lever, which we shall hereinafter denominate as the "friction-lever," having a bar or roll 12, over which the warp passes from the spool $d^2$ on its way to and over the girt $a^5$ to the harnesses and the reed. (Not shown.) Each friction-lever $D^4$ has its pivots 13 located below the bearings for the journals of the spools. The yoke-like let-off lever $e$, provided with a bar or roll $e'$, has its pivots at 14 on the stands D above the bearings for the journals D′ of the spool with which it co-operates, as thereby whenever the yoke-like weighted lever $e$ is raised sufficiently to uncover the spool-journals the said warp-spools may be readily removed from their bearings. The warp passes from the spools over the rod or roll 12 of the friction-lever and under the bar or roll $e'$ of the let-off lever, the latter hanging upon the warp by a force due to the weight $e^2$ and taking up any slack therein between the spool and the weaving-point. As the cloth is being woven the let-off lever $e$ is gradually raised, and when the warp should be let off a projection 15 on the let-off lever $e$, as herein shown, strikes a portion of the friction-lever $D^4$, raises it, and releases the friction-band sufficiently to let the warp-spool rotate in its bearings.

Instead of the let-off lever lifting the friction-lever through the projection described, the said projection may be removed and the tension upon the friction-lever be relieved by elevating the let-off lever so high that the pressure of the yarn upon the lever will be sensibly diminished and let the spool turn. The let-off lever $e$ has at its outer end a cross-bar 17, (shown best in Figs. 2 and 3,) preferably oblong in cross-section, so that the slotted weight $e^2$ may be easily placed thereon and be kept in position, which could not be done if the bar were round.

Applying the weights directly to the horizontal bar of the lever $e$ as described obviates the employment of usual scale-beam weights and their objectionable swinging motion.

In narrow-ware looms it is frequently necessary to employ warp spools or beams of different length, according to the width of the fabric being woven, and to enable this adjustment to be effected quickly and easily we have provided tracks on which the spool-supporting stands may be slid, as required, to accommodate the particular length of spool it is desired to use. It is also necessary when making this adjustment that the established horizontal plane which the warp-spool journals are intended to occupy should not be disturbed and that the stands should be maintained in truly vertical position, and to insure this without delay or liability of error on the part of the operator we have provided the two sets of tracks—one for the lower and the other for the upper ends of the stands. If the spool-shafts were sustained in bearings of short stands confined or held only at their lower ends by a screw in a slot, a loom-fixer of skill would always have to be called to adjust the bearing; otherwise the stands would not be at the same height, nor would they be apt to be vertical, so as to present the bearing-surfaces truly horizontal, and with a bearing-stand sustained only at its lower end and by a screw the strain of the warp on the stand and the weight of the spool comes on the screw referred to in the slot.

We claim—

1. In a loom, horizontally-arranged guides and means to support them between the loom sides, combined with stands having bearings for the warp-spools, the said stands being adjustable laterally upon the said guides, substantially as described.

2. In a loom, horizontally-arranged guides and means to support them between the loom sides, combined with stands having bearings for the warp-spools, the said stands being adjustable laterally upon the said guides, and a series of let-off levers pivoted on said stands and made adjustable in unison with them, substantially as described.

3. The stands having bearings for the journals of the warp-beams, a friction-band to act upon the warp-beam, and a connected tension bar or roller located under the warp-threads and operatively supported by said friction-band, combined with a let-off lever above the shaft or journals of the warp-beam, said lever having a bar or roll adapted to act upon the upper portions of the warp-threads, to operate substantially as described.

4. The adjustable stands having bearings for the journals of a warp-spool, a friction-band to act upon the warp-spool, and a tension bar or roller in operative connection with said band, combined with a let-off lever mounted on the stands and provided with a bar or roll adapted to bear against the warp-threads, the said tension-roller and let-off lever adapted to be relatively moved to permit the removal of the warp-spool from the stands without cutting the warp-threads, substantially as described.

In testimony whereof we have signed our names to this specification in the presence of two subscribing witnesses.

HORACE WYMAN.
ALBERT A. GORDON.

Witnesses:
JUSTIN A. WARE,
SAMUEL B. SCHOFIELD.